United States Patent [19]

Strom

[11] Patent Number: 5,094,654

[45] Date of Patent: Mar. 10, 1992

[54] SWING SAW

[76] Inventor: Gregory S. Strom, 4910 NE. 68th Ave., Portland, Oreg. 97218

[21] Appl. No.: 651,889

[22] Filed: Jan. 7, 1991

[51] Int. Cl.⁵ .............................................. F16H 7/08
[52] U.S. Cl. .................................... 474/101; 474/114
[58] Field of Search ..................... 474/101, 109–117, 474/133, 135, 136, 138

[56] References Cited

U.S. PATENT DOCUMENTS

| | | | |
|---|---|---|---|
| 1,723,077 | 8/1929 | Richards | 474/114 X |
| 1,799,261 | 4/1931 | Stoody | 474/114 X |
| 2,166,406 | 7/1939 | Henry | 474/113 X |
| 3,414,106 | 12/1968 | Moran et al. | 474/114 X |

Primary Examiner—Thuy M. Bui
Attorney, Agent, or Firm—Olson & Olson

[57] ABSTRACT

A swing saw for cutting logs to length prior to cutting into lumber or plywood veneer is provided with a rotary arbor shaft coupled to a secondary drive shaft through a drive chain, the secondary drive shaft being coupled to an electric drive motor through drive belts. The secondary drive shaft is supported on laterally spaced bearings which, in turn, are maintained parallel by adjustment screws mounting rotatable sprockets which are coupled together through a secondary chain by which adjustable rotation of one of the sprockets effects simultaneous adjustable rotation of the other sprocket to precisely the same degree and direction. The adjustment screws thus are moved longitudinally in the same direction and precisely the same distance, and therefore the axis of the secondary drive shaft is maintained precisely parallel to the axis of the arbor shaft. The secondary drive shaft is secured by clamp plates when adjusted. Both shafts are mounted on a hollow housing in which the drive chain is contained. The lower end of the housing is provided with a break-away plate which detaches upon impact of the drive chain in the event of breakage, to allow the chain to exit the housing.

10 Claims, 4 Drawing Sheets

SWING SAW

BACKGROUND OF THE INVENTION

This invention relates to cut-off saws, and more particularly to a swing saw for cutting logs to length prior to longitudinal cutting into boards or plywood veneer.

Swing saws of the foregoing type are in limited usage throughout the lumber industry. However, they are characterized by certain limitations and disadvantages, principal among which are the time-consuming procedure for tightening the drive chains periodically as they slacken, the hazard presented to the mechanism, and the power limitation of a belt drive.

In prior swing saws, tightening of the drive chain required adjustment of opposite ends of the driving shaft alternately to move the shaft away from the driven shaft, or arbor, while maintaining the shafts parallel to each other. This time-consuming procedure presents difficulty in producing a parallel alignment which results in premature chain failure or chain breakage.

Also in prior swing saws, breakage of the massive drive chain results in the chain falling by gravity to the proximity of the driven shaft, causing damage to the shaft, chain sprockets and machine case supporting the shaft.

SUMMARY OF THE INVENTION

In its basic concept, this invention provides adjustable supports for both ends of a rotary shaft, with both adjustable supports interconnected to effect adjustment of one end of the rotary shaft simultaneously and to the same extent and direction as the opposite end of the rotary shaft, upon adjustment of only one of the two adjustable supports. This invention also provides the housing of the drive chain and shaft assembly of a swing saw with a break-away section adjacent the lower end of the chain housing, to allow escape of the chain from the housing in the event of breakage and thereby to prevent damage to the machine element weldment.

It is the principal objective of this invention to provide a swing saw which avoids the aforementioned limitations and disadvantages of prior swing saws.

Another objective of this invention is to provide for simultaneous and identical adjustment of both ends of a bearing-supported rotary shaft to maintain parallelism with a cooperating, spaced rotary shaft.

Still another objective of this invention is the provision of a swing saw in which a drive chain housing is provided with a break-away section at the lower end to allow escape of the drive chain from the housing in the event of breakage.

A further objective of this invention is to provide a swing saw of simplified construction for economical manufacture, maintenance and repair.

The foregoing and other objects and advantages of this invention will appear from the following detailed description, taken in connection with the accompanying drawings of a preferred embodiment.

DESCRIPTION OF THE PREFERRED EMBODIMENT

Figure 1:
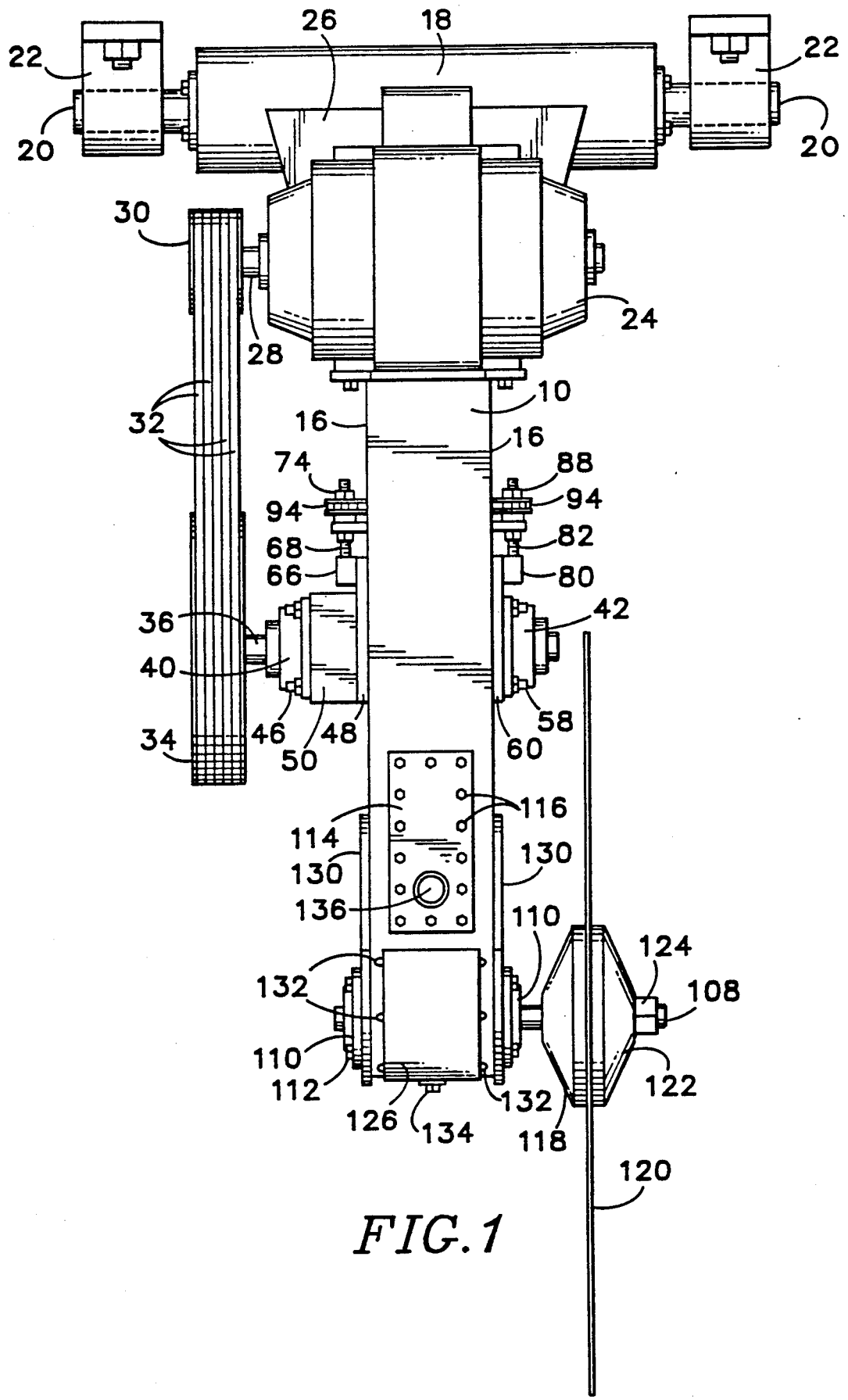
FIG. 1 is a front elevation of a swing saw embodying the features of this invention.
Figure 2:
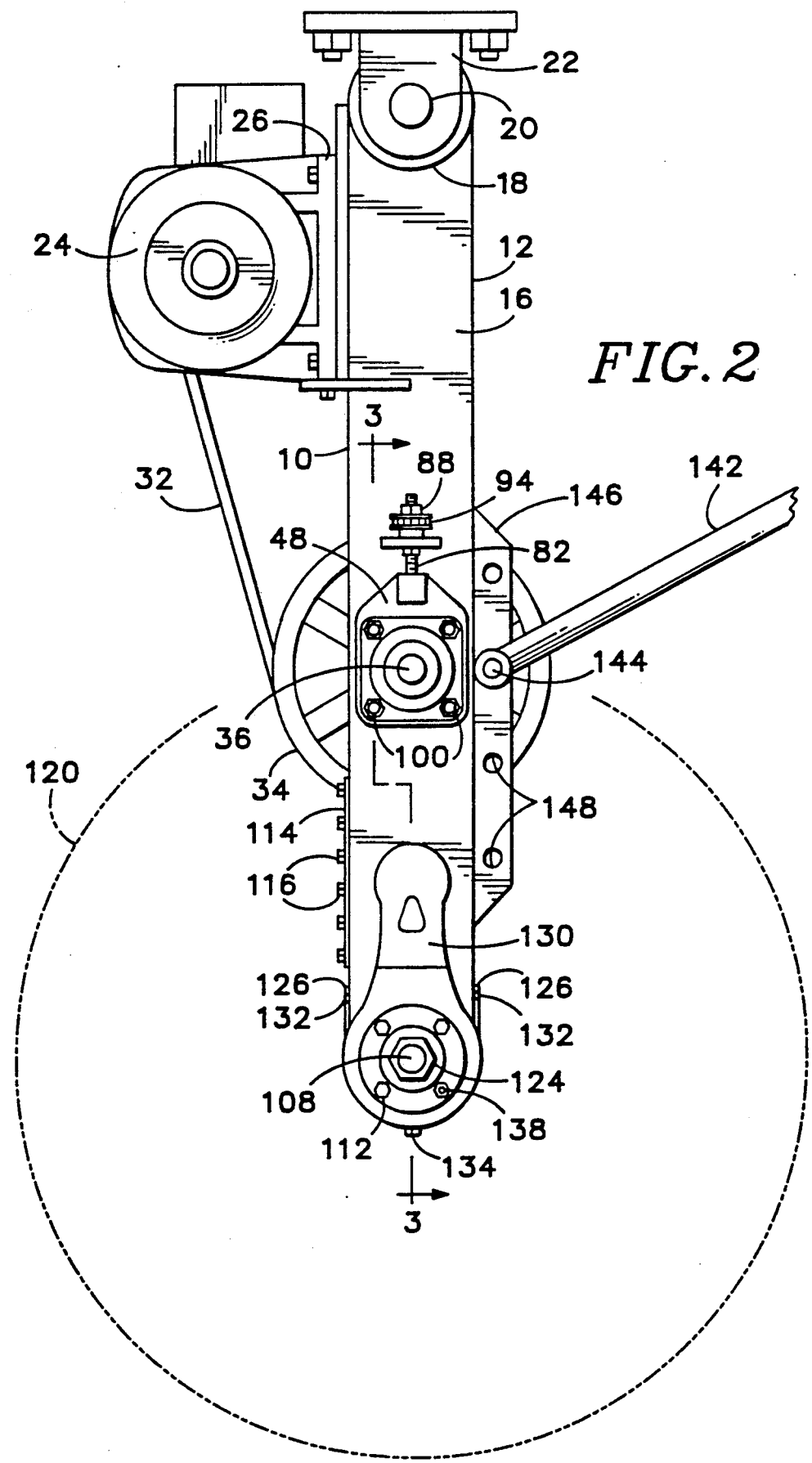
FIG. 2 is a side elevation as viewed from the right in FIG. 1.

Referring primarily to FIGS. 1 and 2 of the drawings, the illustrated swing saw includes an elongated hollow housing which forms the swing arm of the saw. The housing is formed of front wall 10, rear wall 12, bottom wall 14 and interconnecting side walls 16.

The housing is arranged to be suspended vertically from an overhead supporting structure, such as laterally spaced I-beams in a support structure. For this purpose, the upper end of the housing is secured centrally to a laterally elongated bearing tube 18, as by welding. The tube contains laterally spaced bearing end plates which support a pivot shaft 20. The shaft projects beyond the opposite ends of the tube 18 for mounting in supporting pivot bearings 22 which are secured to the support structure.

Figure 3:
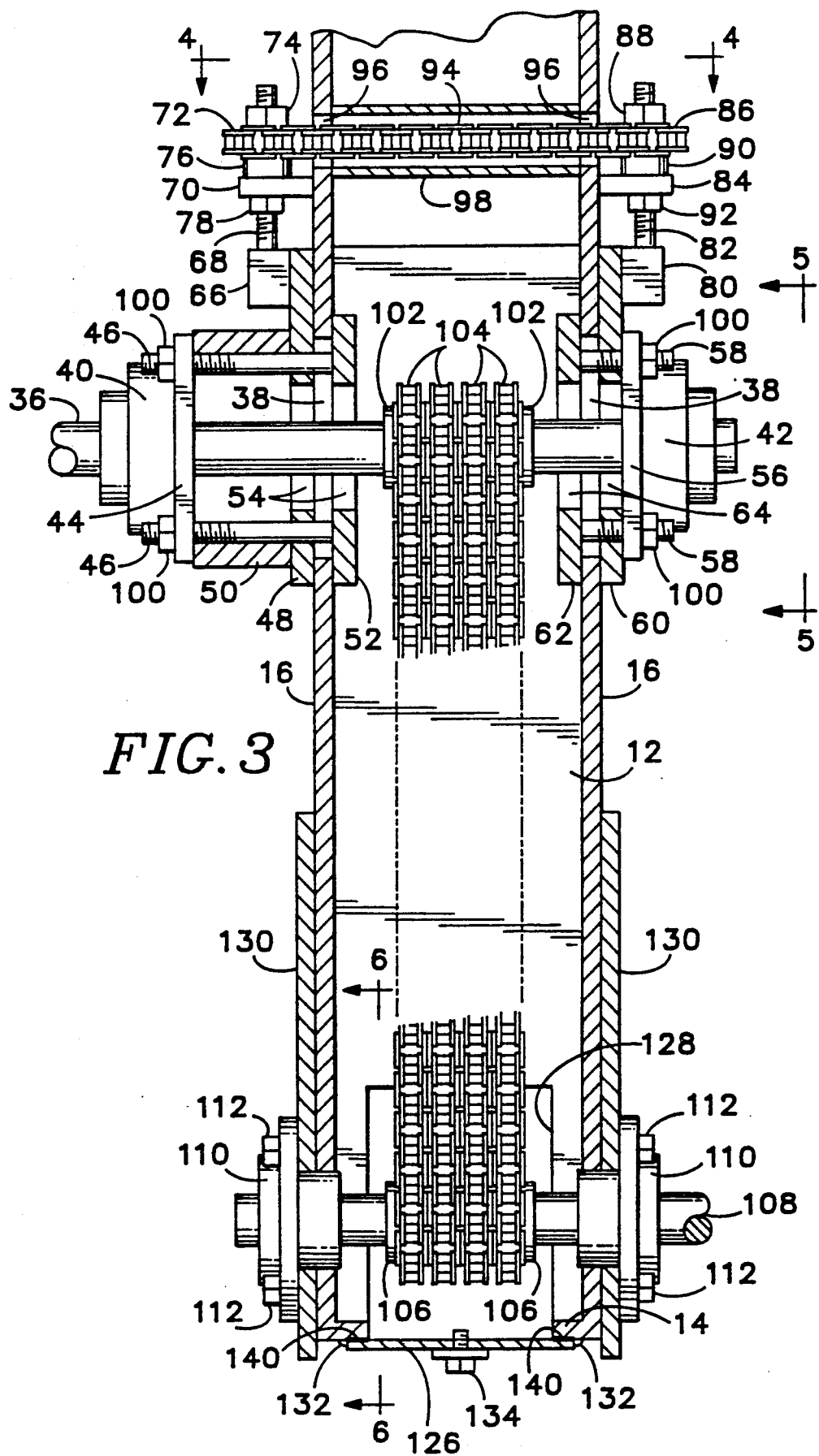
FIG. 3 is an enlarged, fragmentary, vertical sectional view taken on the line 3—3 in FIG. 2.
Figure 4:
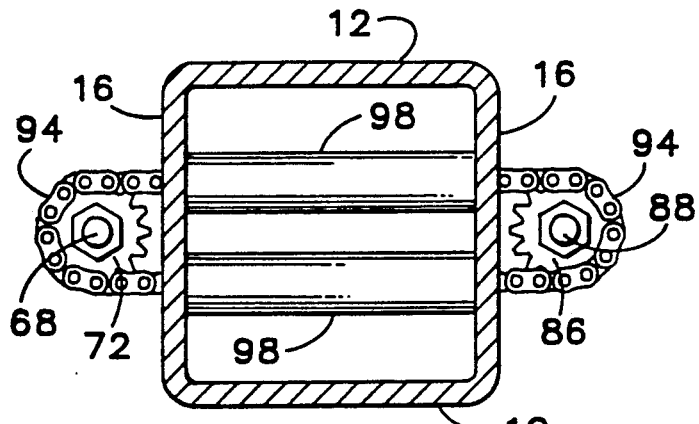
FIG. 4 is a horizontal sectional view taken on the line 4—4 in FIG. 3.

An electric drive motor 24 is mounted on a support plate 26 secured to the front wall 10 of the housing and the bearing tube 18. The output shaft 28 of the motor mounts a multiple pulley 30 for the multiple drive belts 32. The belts also are trained about a multiple pulley 34 carried by an elongated secondary drive shaft 36. This shaft extends laterally through vertically elongated openings 38 in the side walls 16 of the housing (FIG. 3) and is journaled in bearings 40 and 42 located adjacent said side walls.

The bearings 40 and 42 are supported for adjustment in the longitudinal direction of the housing. Thus, bearing 40 has a base flange 44 which is provided with spaced openings for the reception of clamp bolts 46. The bolts also extend through openings in clamp plate 48 which bears against the outer side of side wall 16. Bearing flange 44 and clamp plate 48 are spaced apart by spacer block 50. The bolts then extend through the opening 38 in the side wall and are anchored in clamp plate 52 which bears against the inner side of the side wall. The plates 48 and 52 have central openings 54 for passage of the secondary drive shaft 36 with its sprocket described hereinafter.

Figure 5:
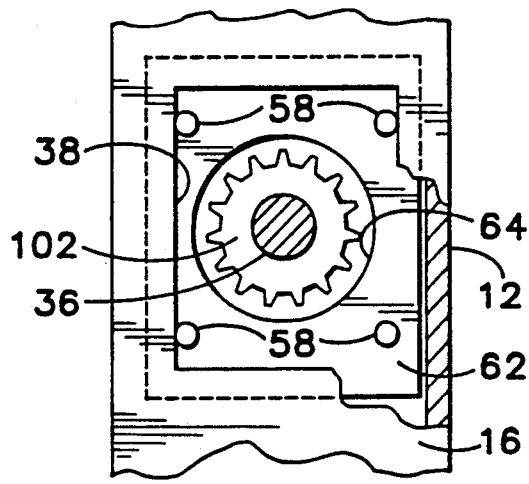
FIG. 5 is a fragmentary vertical elevation as viewed in the direction of arrows 5—5 in FIG. 3, portions being broken away to disclose details of internal construction.
Figure 6:
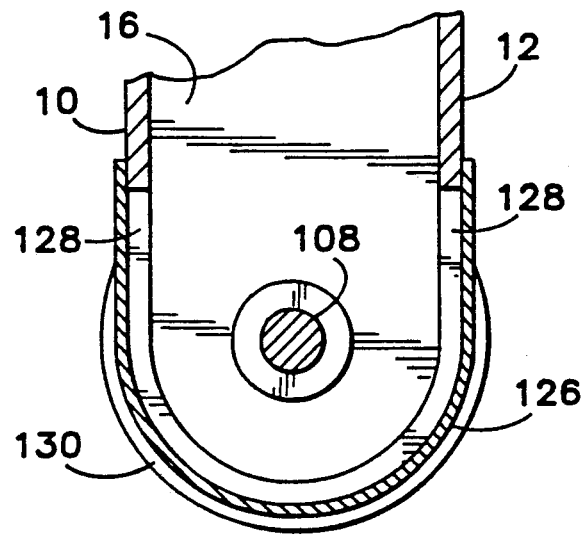
FIG. 6 is a fragmentary vertical sectional view taken on the line 6—6 in FIG. 3.

It is to be noted from FIG. 5 that the clamp bolts 46 are located in sliding engagement with the vertical edges defining the opening 38. Accordingly, the opening functions as a guide for insuring that adjustable movement of the bearing 40 longitudinally of the housing does not include movement in the direction of the front and rear walls 10 and 12, respectively, of the housing.

In similar manner, bearing 42 has a base flange 56 provided with openings for the reception of clamp bolts 58 which also extend through openings in outer clamp plate 60 and guide opening 38 in side wall 16, and are anchored in inner clamp plate 62. The clamp plates 60 and 62 have central openings 64 for passage of the secondary drive shaft 36 with its sprocket.

Outer clamp plate 48 has an outwardly extending block 66 which anchors one end of adjustment screw 68. The screw extends upward freely through an opening in bracket 70 projecting outwardly from side wall 16 of the housing. The upper end of the screw extends through a central threaded bore in sprocket 72 and extends freely through an enlarged unthreaded bore in nut 74 which is secured to the sprocket. The hub 76 on the sprocket bears against the upper side of bracket 70 for rotation relative thereto. A lock nut 78 on the screw 68 under the bracket 70 functions by tightening against the bracket to secure the sprocket 72 against rotation from an adjusted position.

In like manner, outer clamp plate 60 has an outwardly extending block 80 which anchors the lower end of adjustment screw 82. The screw extends upward freely through an opening in bracket 84 welded to side wall 16. The upper end of the screw extends through the central threaded bore in sprocket 86 and extends freely through the enlarged unthreaded bore in nut 88 secured to the sprocket. Hub 90 on the sprocket bears rotatably against the upper side of bracket 84, and lock nut 92 functions to secure the sprocket 86 against rotation.

The sprockets 72 and 86 are coupled together for simultaneous rotation by endless chain 94. The chain extends laterally through openings 96 in the housing side walls 14 and 16 and through protective tubes 98 which span the lateral space between the housing side walls.

From the foregoing, it will be apparent that the secondary drive shaft 36 is supported by the adjustment screws 68 and 82 and that the shaft may be adjusted longitudinally in the housing by moving both support bearings 40 and 42 precisely the same distance and direction. This is achieved by applying a wrench to either one of the sprocket nuts 74 or 88 and rotating the nut. By virtue of the connecting chain 94, both sprockets 72 and 86 are rotated in the same direction and precisely the same amount. This is so, because the sprockets are identical, as are the threads on the adjustment screws 68 and 82. Rotation of the sprockets through precisely the same degree effects longitudinal movement of both adjustment screws and hence both bearings 40 and 42 precisely the same distance. The adjustment is secured by tightening lock nuts 78 and 92 against the brackets 70 and 84, respectively.

The shaft 36 is secured in desired adjusted position by tightening the nuts 100 on the outer ends of the clamp bolts 46 and 58, to draw the clamp plates 48, 52 and 60, 62 against the housing side walls 16.

The secondary drive shaft 36 mounts a multi-strand sprocket 102 having multiple rows of sprocket teeth which receive the corresponding multi-strand drive chain 104. This drive chain extends downwardly in the housing and is trained about sprocket 106 mounted on output driven shaft 108. This shaft is journaled for rotation in laterally spaced bearings 110 secured in piloted openings in the housing side walls 16 by bolts 112.

An inspection plate 114 is mounted removably on the front wall 10 of the housing, as by bolts 116, to cover an opening through which to inspect, install and replace the drive chain.

One end of driven shaft 108 extends laterally outward of the housing and mounts a saw collar 118 for a large diameter circular saw blade 120. A saw collar 122 is slipped onto the shaft 108 outwardly of the saw blade, and an arbor clamp nut 124 is threaded on to the threaded end of the shaft and tightened against the saw collar 122 to secure the saw blade frictionally between the collars, for rotation with the shaft 108. The shaft thus functions as the rotary arbor of the swing saw.

It is to be understood that the axes of the shafts 36 and 108 are maintained parallel to each other, for proper operation of the drive chain 104. As the drive chain stretches during use, shaft 36 is adjusted, by rotation of one of the adjustment nuts 74 or 88, to move the shaft 36 away from the shaft 108. Since both bearings 40 and 42 move precisely the same amount and in the same direction, the axis of shaft 36 is maintained precisely parallel to the axis of shaft 108.

It is to be noted that because the swing saw illustrated is configured for cutting logs to length prior to cutting into boards or plywood veneer, the saw blade 120 typically is about 5 to 9 feet in diameter and the drive motor 24 ranges from about 50 to 150 horsepower. Accordingly, the drive chain 104 is of substantial size and weight. It is because of wear that periodic adjustment of shaft 36 is required to correct for chain stretch.

It is because of the great weight of the drive chain 104 that substantial damage can occur to the arbor 108, sprocket 106 and adjacent area of the housing, in the event of breakage of the drive chain. Breakage of the drive chain results in its falling by gravity to the bottom of the housing where it collects about the arbor shaft 108 and sprocket 106. When breakage occurs, continued rotation of the arbor shaft and sprocket, in a space insufficient for chain pile-up, results in severe damage to them and to the lower end of the housing.

In accordance with this invention, the foregoing damage is relocated to a part that is inexpensive and easy to replace, by providing the lower end portion of the housing with a break-away section which allows the broken drive chain to exit the lower end of the housing. In the embodiment illustrated, the break-away section is provided by a curved plate 126 which removably covers cut-away open portions 128 of the bottom ends of the front, rear and bottom walls of the housing between the reinforcing side plates 130. The break-away plate then is secured to the housing in such manner that it will break away from the housing under the impact of the heavy weight of a broken drive chain.

Various means may be employed to secure the break-away plate 126 to the housing. For example, a few tack welds 132 may be applied at spaced intervals between the edges of the plate and the housing. Alternatively, a few rivets or screws may be employed to attach the plate to the housing. As a further alternative, an adhesive may be employed to bond the plate to the housing.

The break-away plate 126 is provided with a drain plug 134 by which to remove lubricating oil from the lower portion of the housing. Lubricating oil is employed to lubricate the drive chain as it moves between the sprockets, and such oil is introduced through an opening in the inspection plate 114 which is removably closed by a filler plug 136. The oil level in the housing is established by a port 138 extending through one of the bolts 112 which secures one of the bearings 110 to the housing side wall. This oil level is sufficient to contact the drive chain 104 as it moves with the sprocket 106. A sealant material 140 is interposed between the plate 126 and the housing to prevent the escape of lubricating oil from the interior of the housing.

The swing saw is operated by an extensible hydraulic piston-cylinder unit. The cylinder (not shown) is mounted pivotally about a mid trunnion to a support structure provided with the saw, in the lumber mill, and the piston rod 142 of the unit is connected pivotally, as by pivot 144, to a connecting bar 146 on the rear wall 12 of the housing. A plurality of longitudinally spaced openings 148 is provided in the bar to accommodate a variety of connection locations for the piston rod 142, safety strap, etc.

It will be apparent to those skilled in the art that various changes may be made in the size, shape, type, number and arrangement of parts described hereinbefore. For example, the adjustment screws 68 and 82 may be threaded into threaded bores in blocks 66 and 80 and the adjustment nuts 74 and 88 secured rigidly to the adjustment screws. Thus, rotation of the sprockets 72 and 86 effects simultaneous rotation and contemporaneous longitudinal movement of the adjustment screws and bearings 40 and 42 relative to the housing. This and other changes may be made without departing from the spirit of this invention and the scope of the appended claims.

I claim:

1. In a device having an elongated shaft having a longitudinal axis and a support member for supporting the shaft, the combination therewith of
   a) a pair of laterally spaced bearings supporting the shaft,
   b) an elongated screw engaging each bearing and extending perpendicular to the longitudinal axis of the shaft,
   c) a sprocket engaging each screw and supported by said support member, and
   d) a chain interengaging the sprockets for effecting rotation of one sprocket simultaneously with and upon rotation of the other sprocket,
   e) whereby rotation of one sprocket effects movement of both bearings simultaneously in the same direction and the same distance perpendicular to the longitudinal axis of the shaft.

2. The combination of claim 1 including clamp means releasably interengaging each bearing and the support member for securing the bearing in a longitudinally adjusted position on the support member.

3. The combination of claim 2 wherein each screw is mounted on a different one of the clamp means for moving both clamp means and associated bearings by rotation of one of said sprockets.

4. The combination of claim 1 wherein the device includes a second shaft having a longitudinal axis and supported in fixed position on the support member with its longitudinal axis parallel to the longitudinal axis of the first said shaft.

5. The combination of claim 4 wherein the first and second shafts are supported for axial rotation, a drive motor is connected to one of the shafts for rotating said one shaft, and drive connecting means couples said one shaft to the other shaft for rotating said other shaft upon rotation of said one shaft.

6. In a device having an elongated support mounting a laterally extending drive shaft, a driven shaft spaced longitudinally from the drive shaft and disposed parallel thereto, and a drive chain interengaging the drive and driven shafts, the combination therewith of
   a) a pair of laterally spaced bearings supporting the drive shaft,
   b) an elongated screw engaging each bearing and extending in the longitudinal direction of the elongated support,
   c) a sprocket engaging each screw and supported by the elongated support, and
   d) a chain interengaging the sprockets for effecting rotation of one sprocket simultaneously with and upon rotation of the other sprocket, whereby rotation of the sprockets effects movement of the bearings longitudinally of the elongated support.

7. The combination of claim 6 including clamp means releasably interengaging each bearing and the elongated support for securing the bearing in a longitudinally adjusted position on the elongated support.

8. The combination of claim 7 wherein each screw is mounted on a different one of the clamp means for moving both clamp means and associated bearing by rotation of one of said sprockets.

9. The combination of claim 6 wherein the elongated support comprises an elongated hollow housing, the drive shaft extends laterally through the housing, the chain interengaging the sprockets extends laterally through the housing, the driven shaft extends laterally through the housing, and the drive chain is contained within the housing.

10. The combination of claim 9 wherein a lower portion of the housing under the drive chain has an opening for exiting of the drive chain in the event of breakage of the drive chain, and a break-away cover secured to the housing and removably closing said opening, the break-away cover being arranged to detach from the housing upon impact of a broken drive chain.

* * * * *